Patented May 12, 1942

2,282,533

UNITED STATES PATENT OFFICE 2,282,533

DIRECT CURRENT NEGATIVE CARBON ELECTRODE

Russell W. Simon and William W. Lozier, Fostoria, Ohio, assignors to National Carbon Company, Inc., a corporation of New York No Drawing. Original application January 25, 1939, Serial No. 252,718. Divided and this application May 8, 1940, Serial No. 333,916

5 Claims. (Cl. 176—134)

The invention relates to a direct-current carbon arc system of the type useful in providing a light source for motion picture projection, or for other purposes where light energy of high intrinsic brilliancy is desired, and is particularly concerned with an improved negative electrode for use in such system.

The conventional direct current arc system comprises a positive and negative carbon electrode arranged at an angle to each other, or co-axially, in arc relationship, and burning under conditions which provide a current density in the positive electrode sufficient to establish thereon a brilliant light source. The positive electrode usually has a relatively large core containing substantial amounts of rare earth metal compounds or other flame producing material for increasing the brilliancy of the luminous gases in a high intensity arc, or for otherwise modifying the arc characteristics. A core of relatively small diameter is also commonly employed in the negative electrode, in which there is usually incorporated an arc supporting material for the purpose of steadying the arc and centering its contact with this electrode. This core may also contain flame materials, if desired. The shell of both electrodes consists normally of a baked composition of substantially pure carbon containing no additive materials.

To produce a satisfactory and reliable light source, arc stability and steadiness are of essential importance. Incorporating arc supporting material in the core of the negative electrode will contribute a steadying effect, and has heretofore been quite universally adapted as a suitable manner of promoting arc stability. While this is effective under ideal burning conditions, it does not entirely avoid arc unsteadiness where it may be difficult, as is often the case, to control accurately all factors influencing proper arc operation. There is a tendency, for example, under certain burning conditions, to form on the tip of the negative electrode a coating or layer of carbide derived from the flame material in the core of the positive electrode. This carbide deposit is definitely undesirable, and because of its highly insulating qualities, it causes the arc flame to wander erratically over the end of the negative electrode, producing a very unsteady light radiation. A heavy carbide layer may even prevent restriking of the arc when it is once interrupted. This phenomenon is especially prevalent in direct current arc systems employing a stationary positive electrode in a horizontal trim, and burning under comparatively low amperage with a short arc gap.

It is an object of this invention to provide a direct current carbon arc system capable of producing a more uniform and stable source of light radiation over a wider and more variable range of burning conditions. A further object is to provide an improved negative electrode for use in such system which is resistant to the formation of carbide on the tip while burning in the arc.

We have found that arc steadiness may be substantially improved by entirely omitting the core from the negative electrode, and modifying the shell composition to incorporate therein suitable quantities of an arc supporting material. A hollow shell electrode of this type will burn as a negative in arc relationship with a conventional positive electrode, without any substantial formation of carbide on the tip, and the arc contact to the negative remains more constant under all burning conditions. The core hole size may be of the same order heretofore used in cored negative carbons, and preferably the core hole is plugged at the end opposite the burning tip to prevent passage of air through the electrode while burning. In light projection apparatus adapted to operate on a relatively short arc with a horizontal coaxial trim and a non-rotating positive electrode, this hollow negative is of particular advantage and will maintain a more stable arc at higher amperages than the conventional cored negative electrodes.

Materials heretofore known and used in an arc supporting capacity are quite suitable for dispersing in the shell composition, among which are the alkali metal compounds, in particular potassium salts. Only minor quantities of the arc-supporting compound are necessary, and potassium sulfate or potassium silicate, for example, have been found very effective when incorporated into the negative electrode shell in quantities of about 3% to 5% by weight of the finished shell composition. The manner of introducing the arc supporting material into the shell bears no particular significance to the results obtained. This can be accomplished, for example, by impregnation of the baked shell in a saturated salt solution under pressure, with subsequent drying, or by directly blending the potassium salt into the shell mix composition prior to extrusion or forming of the carbon.

It will be understood that considerable modification is possible within the broader scope of the invention, particularly with respect to the type of arc system with which the proposed negative is adapted for valuable use, including any conventional trim position or operation where formation of carbide tip on the negative has heretofore been troublesome. Advantages are afforded in practically any type of direct current arc, either of high intensity, where the current density on the positive carbon is in the neighborhood of 500 amperes or higher per square inch cross section, or in the flame type arc which may burn at a current density of as low as 150 amperes per square inch. The negative, as well as the positive shell, may if desired be coated with copper or other metal to increase the current carrying capacity of a specific sized carbon. The invention should not be limited other than as defined in the appended claims.

This application is a division of our application Serial No. 252,718, filed January 25, 1939, issued as Patent No. 2,229,227.

We claim:

1. An "anti-carbide tip" negative electrode for a direct current carbon arc, comprising a hollow shell predominantly consisting of carbon and containing an arc-supporting material of an alkali metal salt intimately and uniformly dispersed therein, said arc-supporting material constituting an amount not substantially greater than about 5% by weight of the total shell composition.

2. An "anti-carbide tip" negative electrode for a high intensity direct current carbon arc, comprising a hollow shell predominantly consisting of carbon and containing an arc-supporting material intimately and uniformly dispersed therein, said arc-supporting material being composed of a compound of the group consisting of potassium sulfate and potassium silicate in an amount not substantially greater than about 5% by weight of the total shell composition.

3. An "anti-carbide tip" negative electrode for a high intensity direct current carbon arc, comprising a metal coated hollow shell predominantly consisting of carbon and containing an arc-supporting material intimately and uniformly dispersed therein, said arc-supporting material being composed of a compound of the group consisting of potassium sulfate and potassium silicate in an amount of about 3% to 5% by weight of the total shell composition.

4. A negative electrode for a direct current carbon arc, characterized by a resistance to formation of carbide on the tip when burned in such arc with a positive carbon having a core containing flame material, said negative electrode comprising a hollow shell predominantly consisting of carbon and containing an arc-supporting material intimately and uniformly dispersed therein, said arc-supporting material constituting an amount not substantially greater than about 5% by weight of the total shell composition.

5. A negative electrode for a high intensity direct current carbon arc, characterized by a resistance to formation of carbide on the tip when burned in such arc in coaxial short arc relationship with a positive carbon having a core containing flame material, said negative electrode comprising a hollow shell predominantly consisting of carbon and containing an arc-supporting material intimately and uniformly dispersed therein, said arc-supporting material being composed of a compound of the group consisting of potassium sulfate and potassium silicate in an amount of about 3% to 5% by weight of the total shell composition.

RUSSELL W. SIMON.
WILLIAM W. LOZIER.